US009805544B2

(12) United States Patent
Hutcheson et al.

(10) Patent No.: US 9,805,544 B2
(45) Date of Patent: Oct. 31, 2017

(54) METHOD AND SYSTEM FOR MEDIATING INTERACTIVE SERVICES OVER A WIRELESS COMMUNICATIONS NETWORK

(71) Applicant: INTEL CORPORATION, Santa Clara, CA (US)

(72) Inventors: Doug Hutcheson, San Diego, CA (US); Richard Robinson, Temecula, CA (US); Steven Caliguri, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 14/321,587

(22) Filed: Jul. 1, 2014

(65) Prior Publication Data

US 2014/0378231 A1 Dec. 25, 2014

Related U.S. Application Data

(63) Continuation of application No. 12/628,930, filed on Dec. 1, 2009, now Pat. No. 8,769,122, which is a continuation of application No. 11/032,303, filed on Jan. 10, 2005, now Pat. No. 7,627,680, which is a continuation of application No. 09/885,964, filed on Jun. 22, 2001, now Pat. No. 6,874,029.

(Continued)

(51) Int. Cl.
*G06F 15/16* (2006.01)
*G07F 17/32* (2006.01)
(Continued)

(52) U.S. Cl.
CPC ........ *G07F 17/3218* (2013.01); *A63F 13/332* (2014.09); *A63F 13/352* (2014.09);
(Continued)

(58) Field of Classification Search
CPC ............. G06F 17/3218; G06F 17/3211; G06F 17/3223; G06F 17/3237; G06F 17/3239;
(Continued)

(56) References Cited

U.S. PATENT DOCUMENTS

| 4,850,007 A | 7/1989 | Marino et al. |
| 4,918,601 A | 4/1990 | Vermesse |

(Continued)

FOREIGN PATENT DOCUMENTS

| EP | 1066867 A2 | 1/2001 |
| EP | 1066868 A2 | 1/2001 |
| EP | 1086732 A1 | 3/2001 |
| EP | 1087323 A1 | 3/2001 |

(Continued)

OTHER PUBLICATIONS

Office Action dated Oct. 11, 2016 in U.S. Appl. No. 14/049,78, and related attachments.

(Continued)

*Primary Examiner* — Viet Vu
(74) *Attorney, Agent, or Firm* — Christopher K. Gagne

(57) ABSTRACT

The present invention is directed to a method and system for controlling the state of an interactive application and controlling delivery of the interactive application to one or more users. The system of the present invention is a system for delivering an interactive application to one or more users of a communications network and may comprise an interactive application adapted to the communications network; a user access device adapted to receive said interactive application; control means for establishing parameters under which said interactive application is rendered on said user access device; and mediation means for establishing terms for the interaction between the at least one user and other users and the communications network.

18 Claims, 9 Drawing Sheets

Related U.S. Application Data

(60) Provisional application No. 60/283,777, filed on Apr. 13, 2001, provisional application No. 60/252,468, filed on Nov. 22, 2000.

(51) Int. Cl.

| | | |
|---|---|---|
| *G06F 3/01* | (2006.01) | |
| *G06F 3/00* | (2006.01) | |
| *G06F 3/16* | (2006.01) | |
| *A63F 13/795* | (2014.01) | |
| *A63F 13/332* | (2014.01) | |
| *A63F 13/352* | (2014.01) | |
| *A63F 13/77* | (2014.01) | |
| *A63F 13/335* | (2014.01) | |

(52) U.S. Cl.
CPC ............ *A63F 13/77* (2014.09); *A63F 13/795* (2014.09); *G06F 3/005* (2013.01); *G06F 3/016* (2013.01); *G06F 3/16* (2013.01); *G07F 17/3211* (2013.01); *G07F 17/3223* (2013.01); *G07F 17/3237* (2013.01); *G07F 17/3239* (2013.01); *G07F 17/3241* (2013.01); *G07F 17/3255* (2013.01); *G07F 17/3272* (2013.01); *G07F 17/3295* (2013.01); *A63F 13/335* (2014.09); *A63F 2300/204* (2013.01); *A63F 2300/406* (2013.01); *A63F 2300/50* (2013.01); *A63F 2300/534* (2013.01); *A63F 2300/5546* (2013.01); *A63F 2300/5566* (2013.01)

(58) Field of Classification Search
CPC ............ G06F 17/3241; G06F 17/3255; G06F 17/3272; G06F 17/3295; A63F 13/332; A63F 13/352; A63F 13/77; A63F 13/795; A63F 13/335; A63F 2300/204; A63F 2300/406; A63F 2300/50; A63F 2300/534; A63F 2300/5546; A63F 2300/5566

See application file for complete search history.

(56) References Cited

U.S. PATENT DOCUMENTS

| | | |
|---|---|---|
| 5,396,225 A | 3/1995 | Okada et al. |
| 5,586,937 A | 12/1996 | Menashe |
| 5,618,045 A | 4/1997 | Kagan et al. |
| 5,738,583 A | 4/1998 | Comas et al. |
| 5,809,415 A | 9/1998 | Rossmann |
| 5,820,463 A | 10/1998 | O'Callaghan |
| 5,848,396 A | 12/1998 | Gerace |
| 5,852,775 A | 12/1998 | Hidary |
| 5,862,220 A | 1/1999 | Perlman |
| 5,899,855 A | 5/1999 | Brown |
| 5,905,865 A | 5/1999 | Palmer et al. |
| 5,918,603 A | 7/1999 | Brown |
| 5,937,037 A | 8/1999 | Kamel et al. |
| 5,942,969 A | 8/1999 | Wicks |
| 5,959,596 A | 9/1999 | McCarten et al. |
| 5,970,143 A | 10/1999 | Schneier et al. |
| 5,991,735 A | 11/1999 | Gerace |
| 6,009,150 A | 12/1999 | Kamel |
| 6,024,643 A | 2/2000 | Begis |
| 6,038,599 A | 3/2000 | Black et al. |
| 6,042,477 A | 3/2000 | Addink |
| 6,049,821 A | 4/2000 | Theriault et al. |
| 6,050,898 A | 4/2000 | Vange et al. |
| 6,055,510 A | 4/2000 | Henrick et al. |
| 6,078,789 A | 6/2000 | Bodenmann et al. |
| 6,101,381 A | 8/2000 | Tajima et al. |
| 6,104,837 A | 8/2000 | Walker |
| 6,113,494 A | 9/2000 | Lennert |
| 6,113,495 A | 9/2000 | Walker et al. |
| 6,128,660 A | 10/2000 | Grimm et al. |
| 6,132,315 A | 10/2000 | Miyamoto et al. |
| 6,134,532 A | 10/2000 | Lazarus et al. |
| 6,134,590 A | 10/2000 | Perlman |
| 6,157,841 A | 12/2000 | Bolduc et al. |
| 6,181,927 B1 | 1/2001 | Welling, Jr. et al. |
| 6,208,866 B1 | 3/2001 | Rouhollahzadeh et al. |
| 6,216,129 B1 | 4/2001 | Eldering |
| 6,223,291 B1 | 4/2001 | Puhl et al. |
| 6,238,291 B1 | 5/2001 | Fujimoto et al. |
| 6,285,681 B1* | 9/2001 | Kolze .................. H04L 1/0002 370/395.5 |
| 6,314,572 B1 | 11/2001 | LaRocca et al. |
| 6,315,668 B1 | 11/2001 | Metke et al. |
| 6,343,313 B1 | 1/2002 | Salesky et al. |
| 6,352,479 B1 | 3/2002 | Sparks, II |
| 6,353,839 B1 | 3/2002 | King et al. |
| 6,361,440 B1 | 3/2002 | Ogawa et al. |
| 6,371,854 B1 | 4/2002 | Ikeda et al. |
| 6,383,075 B1 | 5/2002 | Jeong et al. |
| 6,416,414 B1 | 7/2002 | Stadelmann |
| 6,434,378 B1 | 8/2002 | Fougnies et al. |
| 6,453,029 B1 | 9/2002 | Campbel |
| 6,453,160 B1 | 9/2002 | Thomas et al. |
| 6,463,078 B1 | 10/2002 | Engstrom et al. |
| 6,477,573 B1 | 11/2002 | Lea |
| 6,511,378 B1 | 1/2003 | Bhatt et al. |
| 6,524,189 B1 | 2/2003 | Rautila |
| 6,587,441 B1 | 7/2003 | Urban et al. |
| 6,601,091 B1* | 7/2003 | Spilo .................. G06F 17/30902 707/E17.12 |
| 6,677,858 B1 | 1/2004 | Faris et al. |
| 6,680,922 B1 | 1/2004 | Jorgensen |
| 6,684,062 B1 | 1/2004 | Gosior et al. |
| 6,699,125 B2 | 3/2004 | Kirmse et al. |
| 6,716,103 B1 | 4/2004 | Eck et al. |
| 6,719,631 B1 | 4/2004 | Tulley et al. |
| 6,726,567 B1 | 4/2004 | Khosla |
| 6,765,925 B1 | 7/2004 | Sawyer et al. |
| 6,772,245 B1* | 8/2004 | Pomerantz ............ G06F 13/385 709/233 |
| 6,779,119 B1* | 8/2004 | Moshfeghi ........ G06F 17/30132 707/999.002 |
| 6,785,561 B1 | 8/2004 | Kim |
| 6,877,096 B1 | 4/2005 | Chung et al. |
| 6,985,494 B2 | 1/2006 | Thompson |
| 7,076,556 B1 | 7/2006 | Brock et al. |
| 7,376,728 B1 | 5/2008 | Motoyama et al. |
| 7,574,493 B2 | 8/2009 | Hutcheson et al. |
| 8,024,434 B2 | 9/2011 | Hutcheson et al. |
| 8,769,122 B2 | 7/2014 | Hutcheson |
| 2001/0005839 A1 | 6/2001 | Maenpaa et al. |
| 2001/0011248 A1 | 8/2001 | Himmel et al. |
| 2001/0013037 A1 | 8/2001 | Matsumoto |
| 2001/0014911 A1 | 8/2001 | Doi et al. |
| 2002/0052239 A1 | 5/2002 | Finn |
| 2004/0002384 A1 | 1/2004 | Multerer |
| 2007/0112706 A1 | 5/2007 | Herbrich |
| 2014/0038707 A1 | 2/2014 | Hutcheson |
| 2015/0241941 A1* | 8/2015 | Luna .................. H04W 52/0229 713/320 |
| 2015/0356819 A1 | 12/2015 | Hutcheson |
| 2015/0356820 A1 | 12/2015 | Hutcheson |

FOREIGN PATENT DOCUMENTS

| | | |
|---|---|---|
| WO | WO 98/17369 A | 4/1998 |
| WO | WO 00/35216 A1 | 8/2000 |
| WO | WO 01/31476 A1 | 5/2001 |

OTHER PUBLICATIONS

Office Action dated Jul. 26, 2016 in U.S. Appl. No. 14/049,783, and related attachments.

* cited by examiner

METHOD AND SYSTEM FOR MEDIATING INTERACTIVE SERVICES OVER A WIRELESS COMMUNICATIONS NETWORK

This application is a continuation application of U.S. patent application Ser. No. 12/628,930, entitled "Method and System for Mediating Interactive Services Over A Wireless Communications Network", filed Dec. 1, 2009, now issued as U.S. Pat. No. 8,769,122, which is a continuation of U.S. patent application Ser. No. 11/032,303, entitled "Method and System for Mediating Interactive Services Over A Wireless Communications Network", filed Jan. 10, 2005, now issued as U.S. Pat. No. 7,627,680, which is a continuation of U.S. patent application Ser. No. 09/885,964, entitled "Method and System for Mediating Interactive Services Over A Wireless Communications Network", filed Jun. 22, 2001, now issued as U.S. Pat. No. 6,874,029, which claims the benefit of and priority to U.S. Provisional Patent Application No. 60/283,377, entitled "Method and System for Mediating Interactive Services Over A Wireless Communications Network", filed Apr. 13, 2001, and U.S. Provisional Patent Application No. 60/252,468, entitled "Method and System for Mediating Interactive Services Over A Wireless Communications Network", filed Nov. 22, 2000, the benefit of and priority to all are claimed thereof and the entire contents of which are incorporated herein by reference.

FIELD OF THE INVENTION

The present invention relates to an improved method and system for providing interactive services over a wireless communications network. In particular, the present invention relates to a system and method for controlling the state of an interactive application and controlling delivery of the interactive application to one or more users. The interactive application is preferably an entertainment application, such as a gaming application.

BACKGROUND OF THE INVENTION

On-line entertainment has been popular for several years. Typically, users connect to the Internet through their desktop computer and enjoy computer-hosted games ranging from simple board games, like backgammon, to more complex and graphic intensive adventure games. Recently, developments in technology have enabled users to engage in multi-player, interactive gaming sessions with other users at remote locations. The ability to play a game with friends, and even strangers, who are not similarly located creates an exciting outlet for gaming aficionados.

Although in its infancy, interactive gaming has become available to users over wireless networks. Using their mobile handset as a game controller, users play games with other players not in their area without being tied down to their desktop computer. The thrill of interactive gaming coupled with the convenience of being able to play anywhere through a mobile handset makes wireless interactive gaming a very exciting, and potentially profitable, opportunity for operators of wireless networks.

Interactive gaming over a wireless network, however, is not without disadvantages. Latency and data transmission delays create performance issues when gaming over any network, but are especially troublesome over wireless communication networks. Many known systems attempt to solve latency issues by offering only simplistic games with no or low quality graphics that are unaffected by communication delays. These systems, however, significantly depreciate the user's gaming experience. In addition, many known wireless interactive gaming systems are not truly interactive. Many systems fail to adapt the state of play of the game based on the skill of the players, features of the users' access devices, or the users' connections to the network, leaving some players at a significant disadvantage. Other known systems tax network capacity and waste network resources to such a degree that network operators must charge users prohibitively high service fees to avoid significant losses. Still other systems fail to mediate the environment on which the game is being played.

Others have attempted to provide multi-player, interactive gaming over a network. For example, Vange, et al., U.S. Pat. No. 6,050,898, discloses a computer-based interactive gaming system comprising a method for initiating and scaling a massive concurrent data transaction. Vange discloses a system and method for optimizing the transmission of computer-hosted game information over a telecommunications link, such as the Internet.

European Patent Application No. 00660124.9, filed by Nokia Corporation, discloses a method and apparatus for playing games between the clients of entities at different locations. Specifically, the Nokia application links multiple players together to a game server through a network using the user's mobile phones. The method involves connecting a (plurality of mobile phones together to a game server through a network for playing the game. The game server is connected to the network. The game scenario is set up at the game server for each of the plurality of mobile phones. The game signals are transmitted between the mobile phones across the network via the game server.

European Patent Application No. 00660125.6, filed by Nokia Corporation, discloses a multi-player game system using a mobile telephone and game unit. The Nokia application discloses using a mobile phone to download a game to separate game units and linking the multiple users using a low power radio link.

European Patent Application No. 00660161.1 filed by Nokia Corporation discloses a system for profiling mobile station activity in a predictive command wireless game system. The application discloses a system and method for customizing an interactive, text-based game based on mobile station activity.

Although many of the prior known gaming systems claim to offer an enhanced, interactive gaming experience, none of the prior known systems of which the present inventors are aware offer a fully interactive real time gaming experience, with high resolution graphics, while efficiently using network resources, managing the game state for a level playing experience among users, and/or offering those services at a low, fixed, monthly service charge, that is not based on minutes of use, over a wireless network communications.

The present invention, in contrast, addresses the problem of how to deliver an enhanced, interactive game experience efficiently and cost effectively. In particular, the system and method of the present invention preferably offer a realtime, interactive experience and improve control of the transfer of game state information. In addition, the present invention preferably controls the game state for a level playing experience and controls delivery of the interactive application to the user to optimize the utilization of limited network bandwidth. This enables the operator to provide a more enhanced interactive gaming experience with the same amount of network resources. This also creates the possibility of providing a wireless game service to end users at a flat monthly rate, rather than on a "per unit of time" basis.

In this regard, the pricing model of Assignee's Cricket™ wireless telecommunications services may preferably be adopted.

OBJECTS OF THE INVENTION

It is therefore an object of the present invention to improve market penetration of interactive wireless services.

Another object of a preferred embodiment of the present invention is to improve market penetration of wireless interactive gaming devices.

A further object of the present invention is to reduce the cost to the system operator of delivering interactive applications.

Yet another object of a preferred embodiment of the present invention is to reduce the cost to the system operator of wireless game service.

An additional object of a preferred embodiment of the present invention is to reduce the degree to which interactive wireless services are network dependent.

Another object of a preferred embodiment of the present invention is to reduce the degree to which interactive wireless services are time of day dependent.

A further object of the present invention is to increase the availability of interactive wireless services.

Yet another object of the present invention is to more efficiently utilize network capacity.

An additional object of a preferred embodiment of the present invention is to more efficiently use network capacity for interactive wireless gaming applications.

A further object of a preferred embodiment of the present invention is to adjust the interactive application to match applicable data transfer requirements of the wireless network.

Another object of a preferred embodiment of the present invention is to maintain a substantial amount of the software required to operate the interactive application on the personal handset device as opposed to the network.

A further object of a preferred embodiment of the present invention is to maintain a substantial amount of the instructions required to operate the interactive application on the personal handset device as opposed to the network, in order to reduce network traffic.

An additional object of a preferred embodiment of the present invention is to adapt the wireless transmissions between the network and the personal device to reduce latency.

A further object of the present invention is to limit the latency of the response of the interactive application.

Another object of a preferred embodiment of the present invention is to provide a reduced cost interactive service.

Yet another object of a preferred embodiment of the present invention is to increase the perceived speed of interactive use.

An additional object of a preferred embodiment of the present invention is to reduce the differences in latency between users of the interactive service.

Another object of a preferred embodiment of the present invention is to achieve a consistent level of latency between users of the interactive service.

A further object of a preferred embodiment of the present invention is to create an even playing field for the interactive services.

Yet another object of a preferred embodiment of the present invention is to eliminate differentials that may exist between users of the interactive service based upon differences in download or modem speed between the portable handheld devices.

An additional object of the present invention is to provide a more cost effective way to deliver interactive services to end users.

Another object of a preferred embodiment of the present invention is to support an interactive gaming community.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

BRIEF SUMMARY OF THE INVENTION

As illustrated in the accompanying diagrams and disclosed in the accompanying claims, the invention is a system for providing one or more wireless interactive applications to one or more users. The system comprises: a wireless communication network; one or more servers, cooperating with the network to deliver one or more interactive application(s) to the one or more users; and one or more wireless access devices, in communication with said network. The one or more wireless access devices receive communication from the server to facilitate the users accessing the one or more wireless interactive applications on the wireless access device.

In an alternative preferred embodiment, the present invention comprises: a wireless communications network; an interactive application delivered over the wireless network to one or more users; one or more wireless access devices adapted to receive and render the interactive application to the user; control means for controlling the state of the interactive application; and network mediation means for controlling delivery of the interactive application to the one or more users.

In another alternative preferred embodiment, the present invention is a system for providing one or more wireless interactive applications to one or more users. The system comprises: a wireless communication network adapted for transmission of communications to facilitate the one or more interactive applications at less than the full frame rate of voice communications, and one or more servers, cooperating with the network to deliver one or more interactive application(s) to the one or more users. The system may also include one or more wireless access devices, in communication with the network. The one or more wireless access devices receive communications from the server to facilitate the users accessing the one or more wireless interactive applications on the wireless access device. The one or more interactive applications preferably further comprise high resolution game applications featuring high resolution graphics, and may reside on the wireless access device.

In yet another alternative preferred embodiment, the present invention is a method for providing one or more interactive applications to one or more users of a wireless communication network. The method according to the present invention comprises the steps of: initiating a request for wireless interactive services to the network; sending communications to the network to request the interactive application; compiling the request and communicating to a wireless access device software necessary to perform the one or more interactive application; and initiating the interactive application. The method preferably further includes the steps of: communicating to the network one or more degrees of freedom of the interactive application; storing information about changes in state of one or more of the degrees of freedom caching the information, communicating the cached information to the server in order to efficiently utilize network resources (said wireless access device communicating signals reflecting the change of state of the interactive application); maintaining one or more interactive applications on the server; synchronizing the interactive applications among the users; and communicating updates to the one or more interactive applications until play is concluded or terminated.

It will be apparent to persons of ordinary skill in the art that modification and variations may be made in the present invention without departing from the scope or spirit of the invention. For example, the one or more interactive applications according to the present invention preferably comprise a range of latency values along a continuum, for example: less than about 30 s; less than about 10 s; less than about 1 s; less than about 500 ms; less than about 300 ms; and/or less than about 200 ms. The one or more interactive applications according to the present invention may also comprise high resolution graphics.

Furthermore, the wireless access device according to the present invention preferably comprises a handheld device. The wireless access device preferably comprises an 8 bit microprocessor, wherein the microprocessor may further comprise a clock speed of greater than about 4 MHz. The wireless access device preferably further comprises a range of memory capability along a continuum, for example: greater than about 256 Kb memory; greater than about 512 Kb memory; greater than about 1 Mb memory, greater than about 2 Mb memory; greater than about 4 Mb of memory; or greater than about 8 Mb of memory.

The wireless access device according to the present invention preferably comprises video display having a range of resolution along a continuum, for example: in excess of 160×144 pixels, or 240×160 pixels, and may comprise a black and white, monochrome, or color display. The color display may be capable of rendering more than for example about 256 colors; 2,000 colors; 24,000 colors; 32,000 colors; or 64,000 colors or other values along a continuum. The wireless access device may comprise battery power sufficient to power the device for more than about 30 hours. In addition, the wireless access device may comprise a 16 bit microprocessor; a 32 bit microprocessor; and/or a 32 bit RISC microprocessor or any other value along a continuum. The microprocessor preferably has a clock speed of greater than about 8 MHz, and may have a clock speed of greater than 16 Mhz or any other value along a continuum. The memory of the microprocessor may be external to the microprocessor. In addition, the wireless access device may comprise VRAM and/or WRAM memory.

The users of the system according to the present invention may be one or more users and preferably comprise up to eight or more simultaneous users. In addition, the system according to the present invention preferably conserves network resources relative to voice traffic. The communication from the network to the wireless access device may occur at a full frame rate. Moreover, the communication from the network to the wireless access device may occur at a half frame rate or other or other levels, more conservative of bandwidth.

Furthermore, the wireless access device according to the present invention preferably caches information regarding the interactive application, fills data packets, and/or dispatches the communications to ensure efficient use of the network. In addition, the application feature according to the present invention offers the user more than three degrees of freedom. The application feature may reside on the wireless access device.

Thus, it is intended that the present invention include the variations and modifications that may be used in conjunction with the invention, provided they come within the scope of the appended claims and their equivalents.

It is to be understood that both the foregoing general description and the following detailed description are exemplary and explanatory only, and are not restrictive of the invention as claimed. The accompanying drawings, which are incorporated herein by reference, and constitute a part of the specification, illustrate certain embodiments of the invention, and together with the detailed description, serve to explain the principles of the present invention.

BRIEF DESCRIPTION OF THE DRAWINGS

The present invention will now be described in connection with the following figures in which like reference numbers refer to like elements and wherein.

DETAILED DESCRIPTION OF THE PREFERRED EMBODIMENTS

Figure 1:
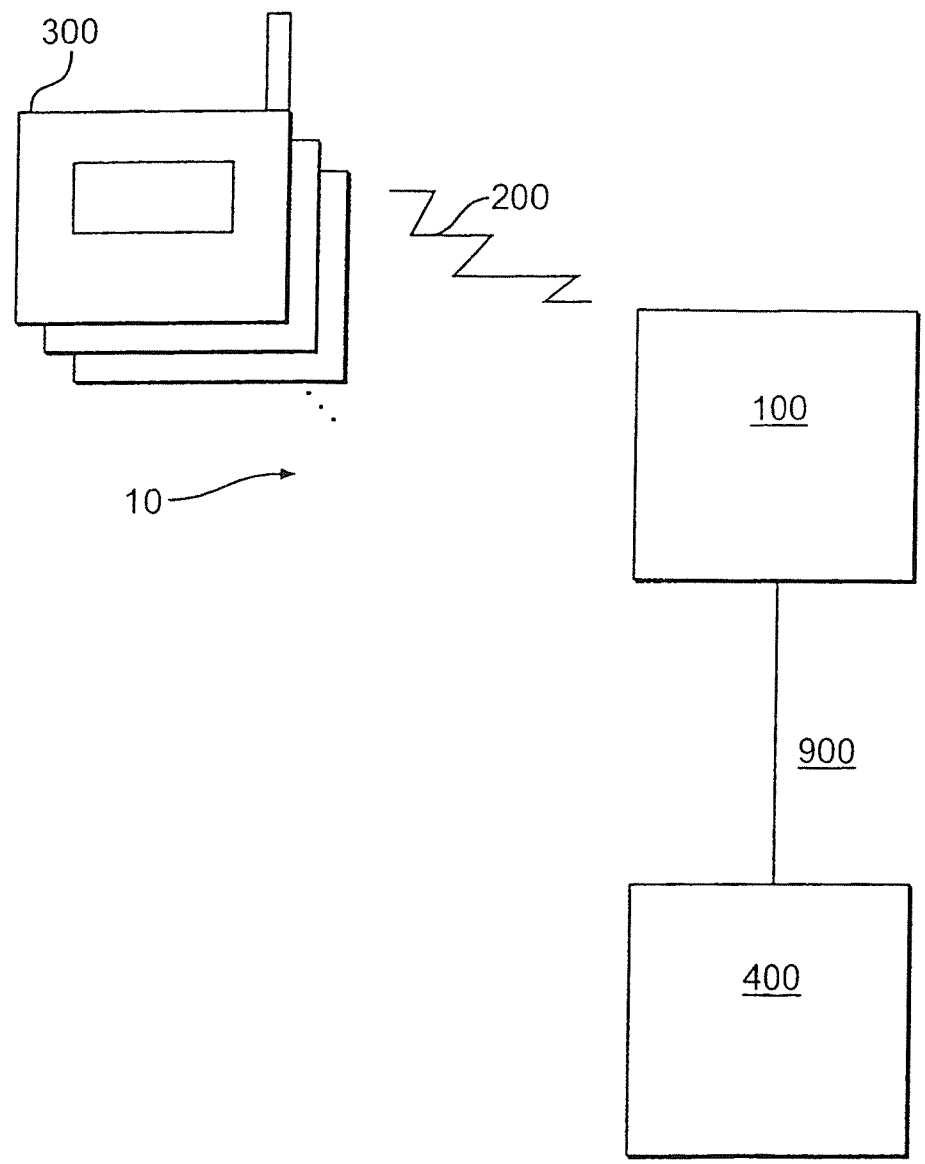
FIG. 1 is a schematic diagram illustrating a preferred embodiment of the system of the present invention.

Reference will now be made in detail to a preferred embodiment of the method and system of the present invention, an example of which is illustrated in the accompanying drawings. A preferred embodiment of the present invention is shown in FIG. 1 as interactive system 10. As shown in FIG. 1, the interactive system 10 comprises: a telecommunications network 100, an interactive application 200 delivered over the network 100 to one or more users; one or more wireless access devices 300 adapted to receive and render the interactive application 200 to the user(s); a game server 400; and interface 900.

A method of practicing a preferred embodiment of the invention will be described, followed by a description of alternative preferred embodiments of the system and method of the present invention.

Method of a Preferred Embodiment of the Present Invention

Figure 3:
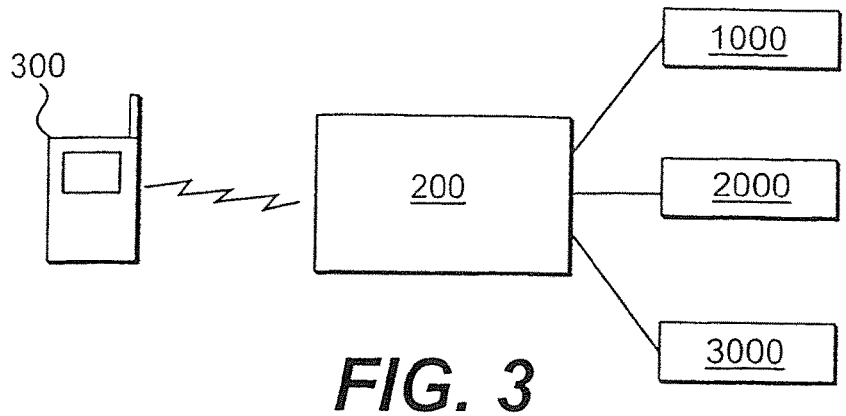
FIG. 3 is a schematic diagram illustrating a preferred embodiment of the method of the present invention.

A preferred embodiment of the method of the present invention is depicted in FIGS. 3, 4, 5, and 8. As shown in FIG. 3, the method of the present invention preferably comprises the steps of: synchronizing 1000, controlling 2000, and mediating 3000 the interactive application 200 rendered to the at least one wireless access device 300.

Figure 4:
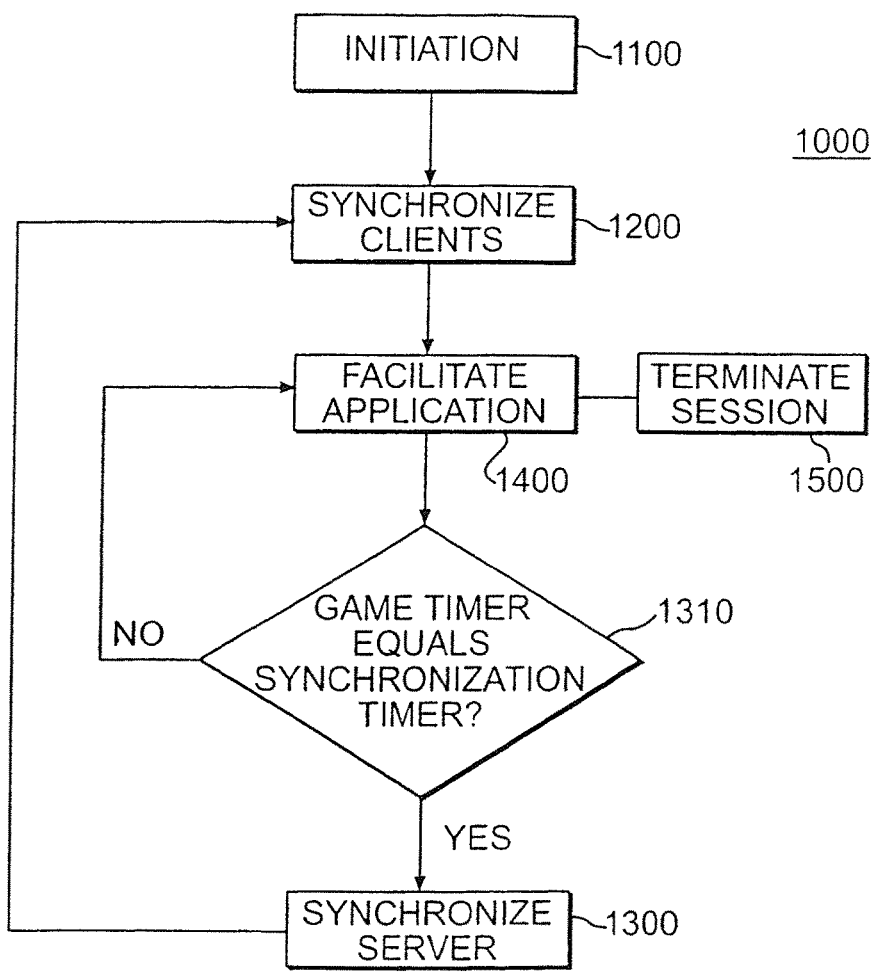
FIG. 4 is a flowchart or process diagram illustrating the synchronization process of a preferred embodiment of the present invention.

A preferred embodiment of the synchronization process 1000 of the present invention is depicted in FIG. 4. The synchronization process 1000 comprises the steps of: initiating the gaming session 1100, including initiating a connection between each of the wireless access devices 200 (clients) and the game server 400; synchronizing the clients 1200; synchronizing the server 1300; and facilitating the interactive application (gaming) session 1400. State of play is preferably synchronized between the various users of the interactive entertainment service. In addition, the game is preferably mediated and controlled to enhance the entertainment experience, while efficiently managing control of the interface between one or more wireless access devices of the users and the wireless communications network.

Figure 5:
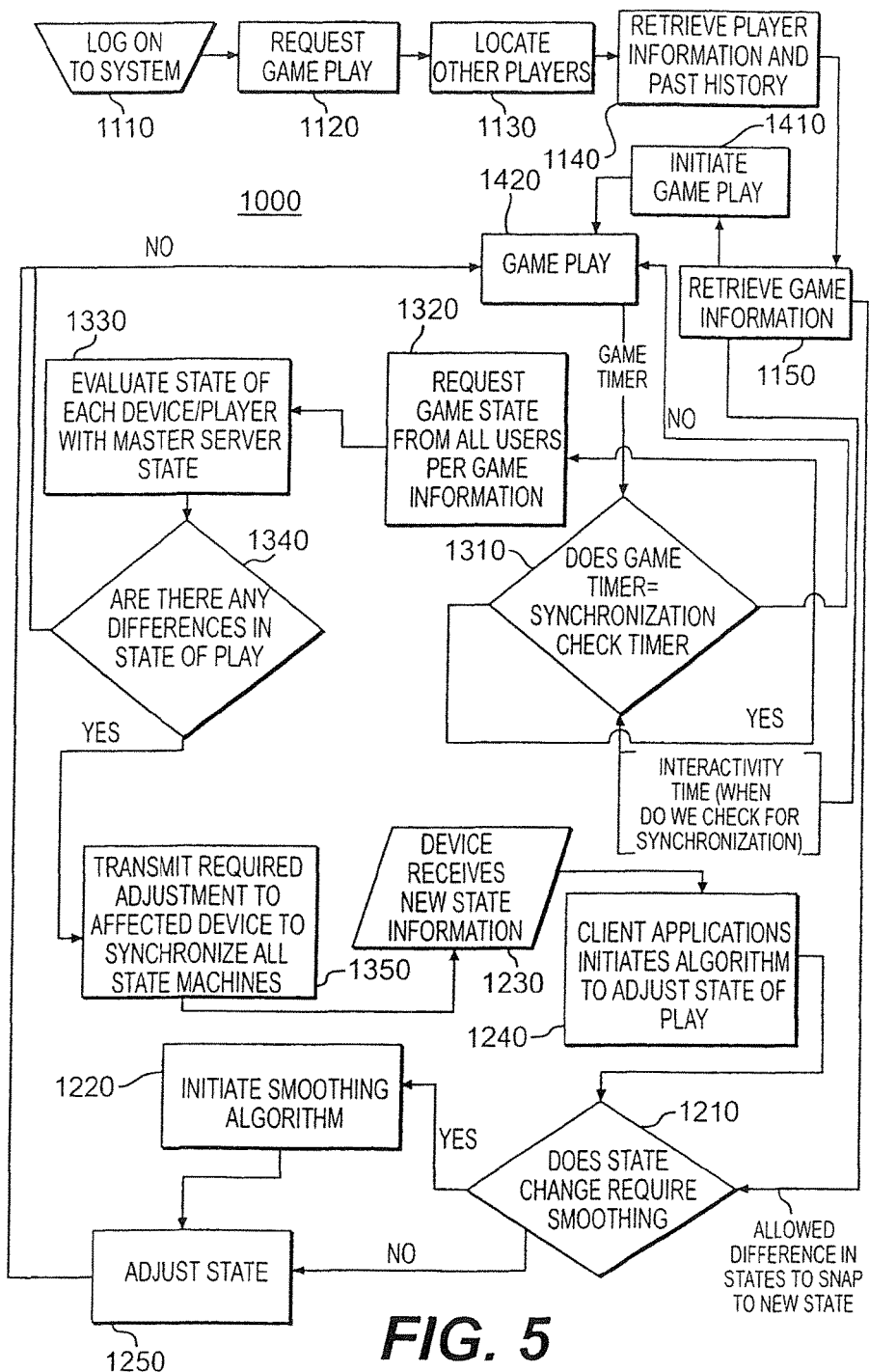
FIG. 5 is a flowchart or process diagram illustrating the synchronization process of an alternative preferred embodiment of the present invention.

FIG. 5 depicts a synchronization process 1000 of an alternative preferred embodiment of the present invention. First, in step 1110, the user logs on to the system. The user then requests game play, in step 1120, from the game server 400. The interactive system 10 then seeks to locate other players, in step 1130, and retrieves player information and past history about the players whom it has located in step 1140. Alternatively, the player information and past history may be retrieved after players are selected for the current gaming session. Next, the interactive system 10 retrieves game information, in step 1150. At this point in the process, the game has been initiated, as shown in step 1410, and the users are ready to begin play.

Game play preferably proceeds, subject to the synchronization process 1000 of the present invention. As shown in FIG. 5, prior to initiating game play, the system preferably checks to insure synchronization between all users 1200. Prior to initiating game play, state information is preferably supplied to synchronization check timer 1310. The synchronization check timer 1310 cooperates with the game timer to determine whether or not the system should confirm synchronization to any users with the game at that point in time. If the game timer has not yet reached the point at which synchronization is called for, the synchronization timer 1310 delivers the users to game play 1420.

As shown in FIG. 5, game play preferably proceeds until the game timer equals the synchronization timer 1310. At that point, the system requests state information from all users relative to game information 1320. The users deliver state information from each of the wireless access devices 200 to the master game server 400, in step 1330, and the master server tests whether there are any differences in the state of play 1340. If there are no differences in the state of play 1340 between the user(s) and the game, the system delivers the user(s) back to the game to continue play 1420.

If there are differences in the state of play between the user(s) and/or the master server, the synchronization process 1000 of the present invention preferably determines and transmits the required adjustments to the affected device in order to synchronize all state machines, as shown in step 1350. The devices then receive the new state information in step 1230.

If desired, the client applications initiate an algorithm to adjust the state of play 1240. The system then determines whether or not the state change requires smoothing in order to provide a high quality interactive experience for the user, as shown in step 1210. If smoothing is desired, the system adjusts the state 1250 and returns the users to game play in step 1420. If smoothing is required, the system initiates a smoothing algorithm, as shown in step 1220, snapping the users to the new state. The state is adjusted in step 1250 and the users are returned to play, as shown in step 1420.

Figure 6:
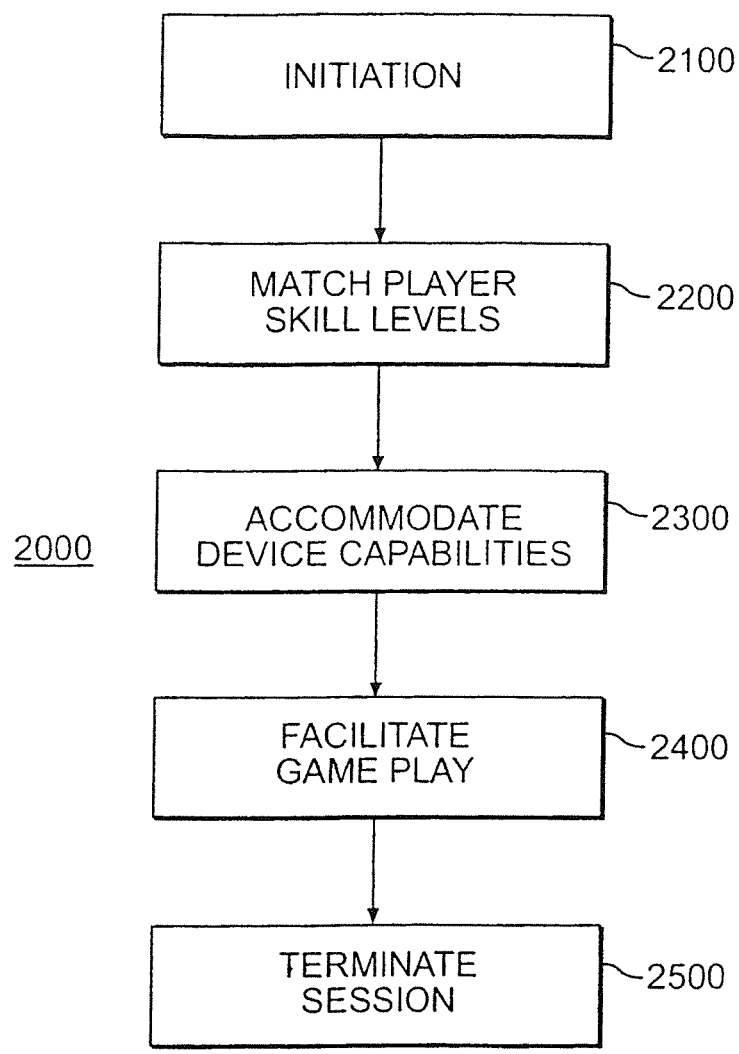
FIG. 6 is a flowchart or process diagram illustrating the game mediation process of a preferred embodiment of the present invention.
Figure 7:
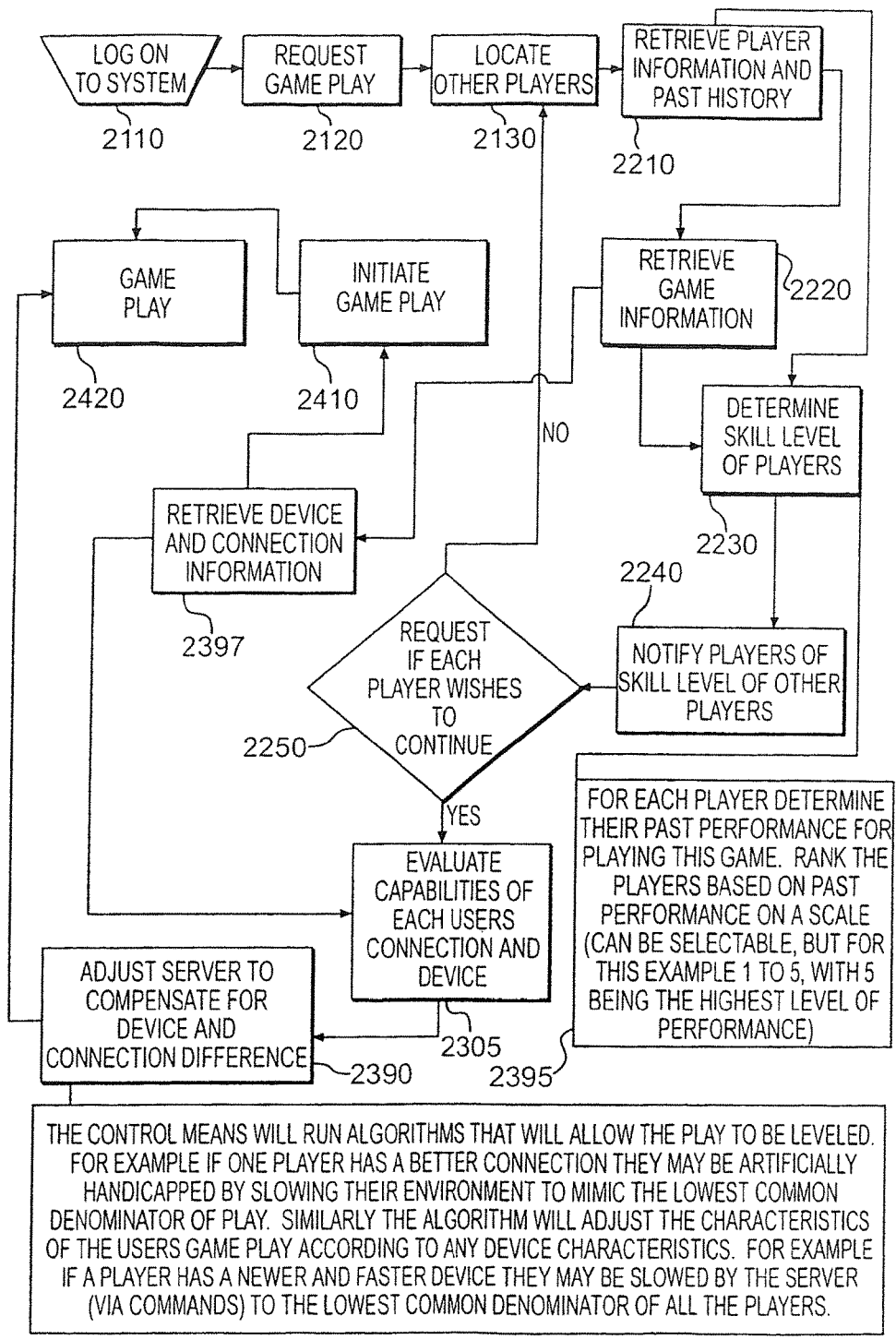
FIG. 7 is a flowchart or process diagram illustrating the game mediation process of an alternative preferred embodiment of the present invention.
Figure 8:
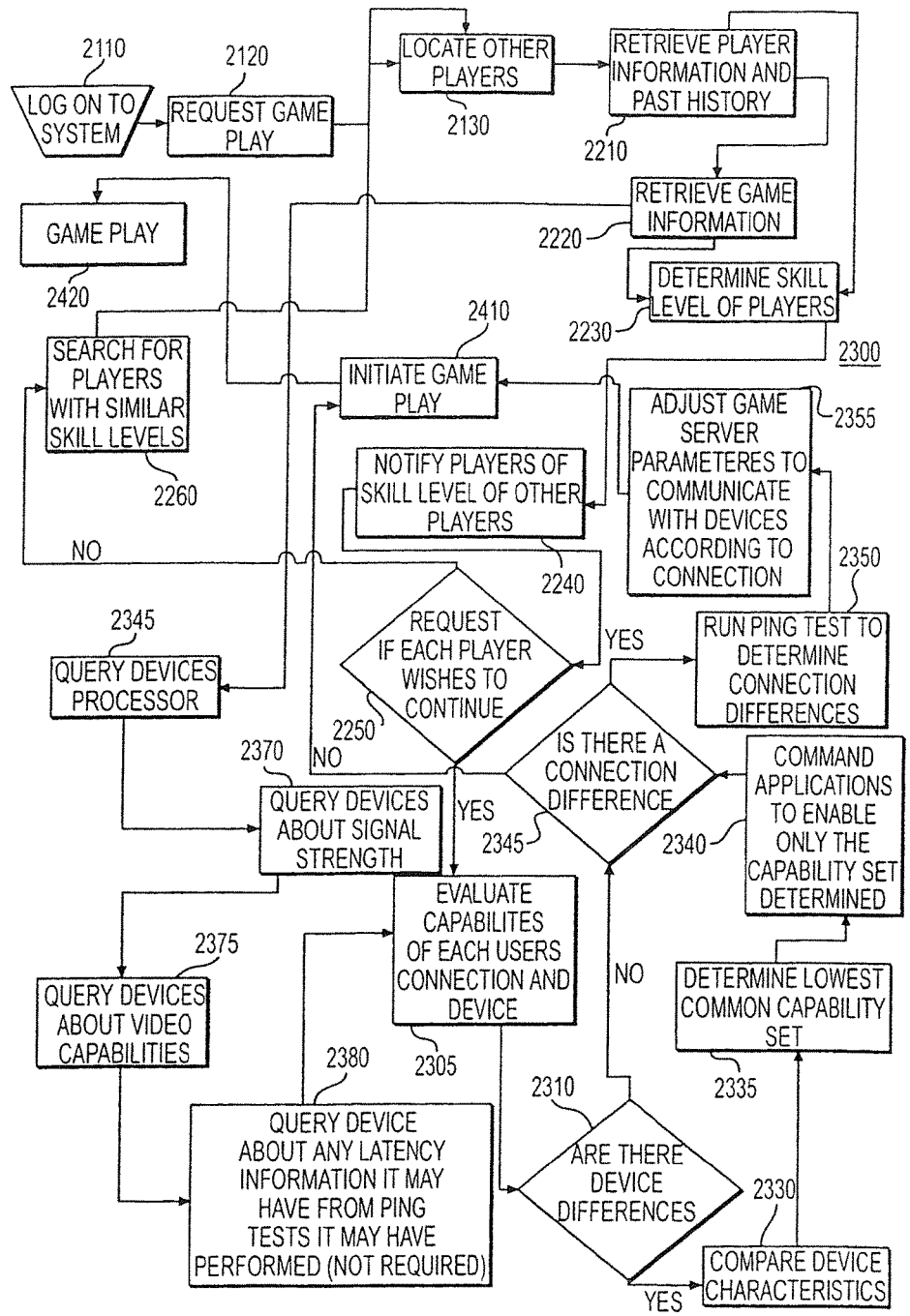
FIG. 8 is a flowchart or process diagram illustrating the game mediation process of an alternative preferred embodiment of the present invention.

FIGS. 6, 7, and 8 depict alternative preferred embodiments of the operation of the control means 600 of the present invention. The control means 600 provides management of the real time state of game play and preferably facilitates the game mediation process 2000 of the present invention. In a preferred embodiment, as shown in FIG. 6, the game mediation process 2000 comprises the steps of: initiating the gaming session 2100; matching skill levels of players 2200; matching and accommodating device capabilities 2300; facilitating game play 2400, and terminating the gaming session 2500.

As shown in FIGS. 7 and 8, in an alternative preferred embodiment, the initiation step 2100 of the control process 2000 preferably further comprises the steps of: logging onto the system 2110; requesting game play 2120; and locating other potential players 2130.

As shown in FIG. 8, the step of matching skill levels 2200, which enables the system to evaluate the players' respective skill levels and determine whether or not they wish to proceed, preferably further comprises the steps of: retrieving player information and past history 2210; retrieving game information 2220; determining the skill level of the respective potential players 2230; notifying each of the prospective players of the skill levels of the other potential players 2240; and requesting each player if they wish to continue 2250. If the players wish to continue, they proceed to the step of matching and accommodating device capabilities 2300, for evaluating and resolving any differences between the user's respective access devices and the network. If the player(s) do(es) not wish to continue, the system searches for other players 2260 with similar skill levels. Once located, the player is returned to the step of locating other players 2130.

If the player wishes to continue in spite of differences in skill level, as determined in step 2250, the system evaluates the capabilities of each user's connection and device in step 2305. The differences in devices are preferably determined in step 2310. If there are differences in the devices, the process preferably proceeds to accommodate the device differences 2300.

FIG. 8 shows, for an alternative preferred embodiment of the present invention, the further steps of accommodating device differences 2300. This process of evaluating and resolving any differences between the users' respective connections and devices of the game mediation process 2000 of the present invention preferably further comprises the steps of: querying the respective devices regarding the capabilities of their processors 2365; querying the respective devices regarding signal strength 2370; querying the respective devices regarding their video capabilities 2375; querying the respective devices about latency 2380; and evaluating the capabilities of each users' device 2305.

Any differences between the devices and connections are determined. If there are differences between the devices, as determined in step 2310, the process then compares the device characteristics in step 2330. The process then determines the lowest common capability set, as shown in step 2335 and issues command applications, as shown in step 2340, to enable only the capability set that has been determined. The process proceeds to determine any differences between each users connection over the network 100, as shown in step 2345. In a preferred embodiment, the process further comprises running a ping test to determine connection differences, as shown in step 2350. The process continues by adjusting the game server parameters to communicate with the devices according to their connection(s), as shown in step 2355, and, then initiating game play in step 2410. If there are no differences between connections, the method proceeds instead directly to step 2410 and the initiation of game play.

FIG. 7 depicts an alternative preferred embodiment of the control process 2000, and in particular, the step 2300 of accommodating device capabilities according to the present invention. As shown in FIG. 7, the accommodating device capabilities 2300 process of the present invention preferably further comprises the steps of: determining one or more players' skill level(s) from past performance or other criteria 2395; evaluating the capabilities of each users' connection and device 2305; and adjusting the game server 400 to accommodate for device and connection differences 2390.

Figure 9:
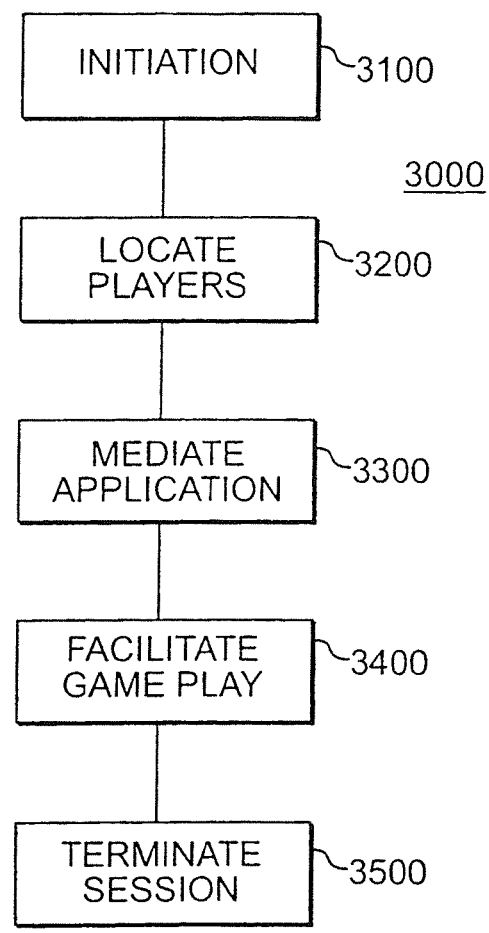
FIG. 9 is a flowchart or process diagram illustrating the network mediation process of a preferred embodiment of the present invention.

FIG. 9 depicts a preferred embodiment of the mediation process 3000 and in particular the network mediation process for matching players of the present invention. As shown in FIG. 9, the network mediation process 3000 of the present invention preferably comprises the steps of: initiating an interactive session 3100; locating potential players 3200; mediating the application 3300; facilitating game play 3400; and terminating the gaming session 3500.

Figure 10:
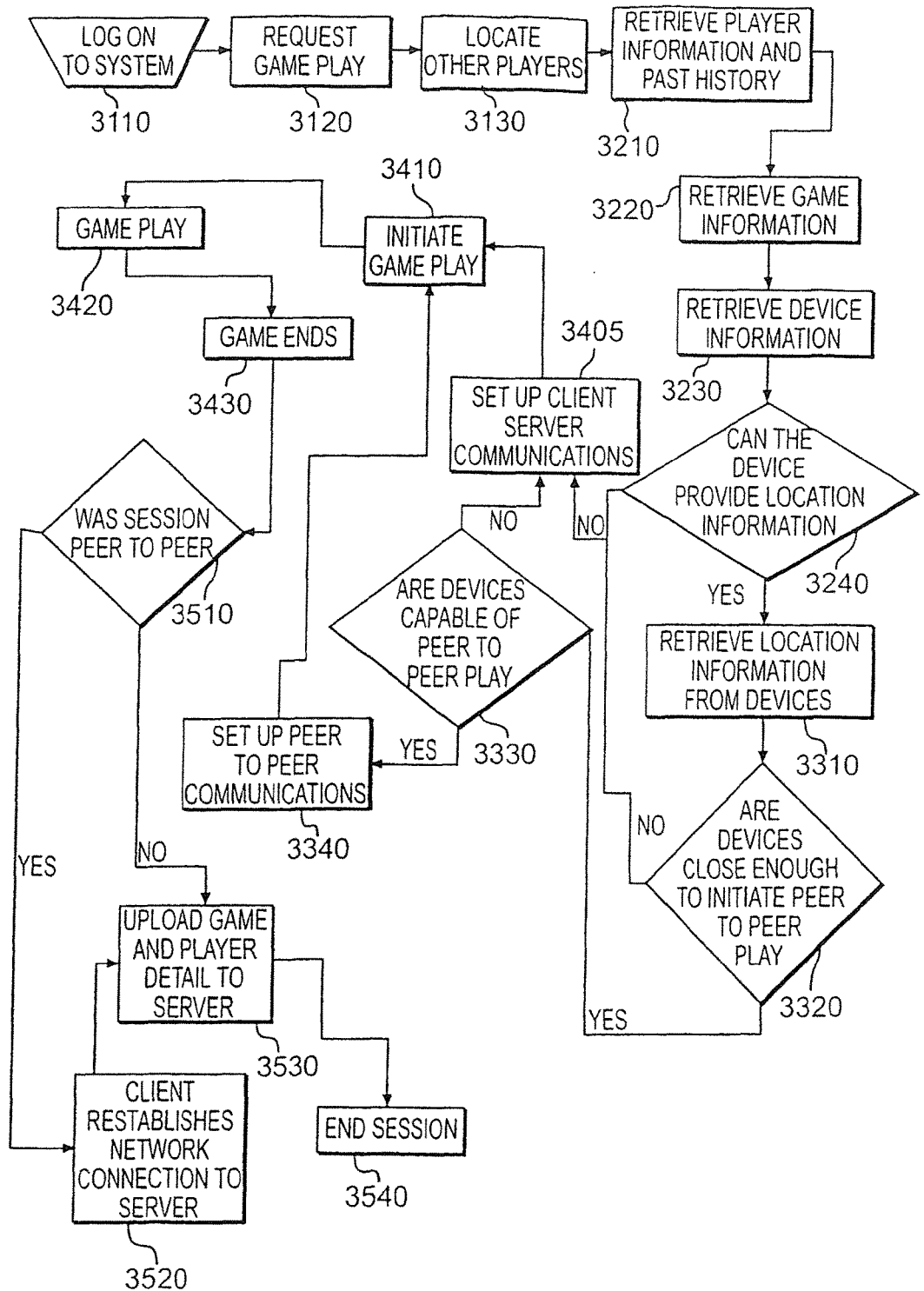
FIG. 10 is a flowchart or process diagram illustrating the network mediation process of an alternative preferred embodiment of the present invention.

An alternative preferred embodiment of the mediation process 3000 of the present invention is shown in FIG. 10. The step of initiating game play 3100, preferably further comprises the steps of: logging on to the system 3110; requesting game play 3120; and locating other players 3130. The step of locating players 3200 preferably further comprises the steps of: retrieving player information and past history 3210, retrieving game information 3220, retrieving device information 3230; and determining whether or not the device can provide location information 3240.

If the device or network does not comprise means to determine and provide to the network or to other users the location of the wireless access device 300, the process proceeds with the step of enabling game play 3400. The step of enabling game play preferably further comprises: setting up client-server communications 3405; initiating game play 3410; enabling game play 3420; and ending the game play session 3430.

To the extent the device is able to provide location information, the process preferably proceeds instead to the step of locating and resolving peer-to-peer communications 3300. In a preferred embodiment of the present invention, the step of evaluating and resolving peer-to-peer communications preferably further comprises the steps of: retrieving location information from the respective devices 3310; determining whether or not the devices are close enough to initiate peer-to-peer play 3320 (and if they are not, proceeding with the step of game play 3400 as described above); determining whether the devices are capable of peer-to-peer play 3330 (and if they are not, proceeding with the step of enabling game play 3400 described above); and setting up peer-to-peer communications 3340.

Once peer-to-peer communications are established, as shown in step 3340, the process preferably proceeds with the step of initiating game play 3410. In a preferred embodiment, it would not be necessary to set up client-server communication, as shown in step 3405, in a peer-to-peer communication environment.

As shown in FIG. 10, the step of terminating a game session preferably further comprises: determining whether or not the session was a peer-to-peer communication 3510; uploading game and player detail 3530 to the server(s) 400; and ending the session 3540. If the session was peer-to-peer, this process further comprises the client reestablishing network connection to the server, as shown in step 3520; uploading game and player detail to the server(s), as shown in step 3530; and ending the session in step 3540. If the session was not a peer-to-peer session, the process proceeds with the steps of uploading the game and player detail to the server 3530 and ending the session 3540.

It will be apparent to persons of ordinary skill that various modifications and variations may be made in the process of the present invention and, in particular, in the synchronization, control, and mediation processes of the invention, without departing from the spirit of the invention. For example, the management and interaction of the presentation, action, and control functionality can each reside at various locations in the system. The system communicates and coordinates these functions between the various users. The hardware and software used to perform these functions, may reside at the wireless access device 200, network 100, or the game server 400, or any combination of those locations. The different functional levels must communicate effectively with one another. The system is adapted to enable them to communicate and cooperate appropriately to achieve the objects of the present invention. Thus, it is intended that the variations and modifications be considered part of the invention, provided they come within the scope of the appended claims and their equivalents.

System of the Present Invention

As shown in FIG. 1, a preferred embodiment of the interactive system 10 of the present invention comprises: a telecommunications network 100; an interactive application 200 delivered over the network 100 to one or more users; one or more user wireless access devices 300 adapted to receive and render the interactive application 200 to the user; a game server 400; and an interface 900.

Figure 2:
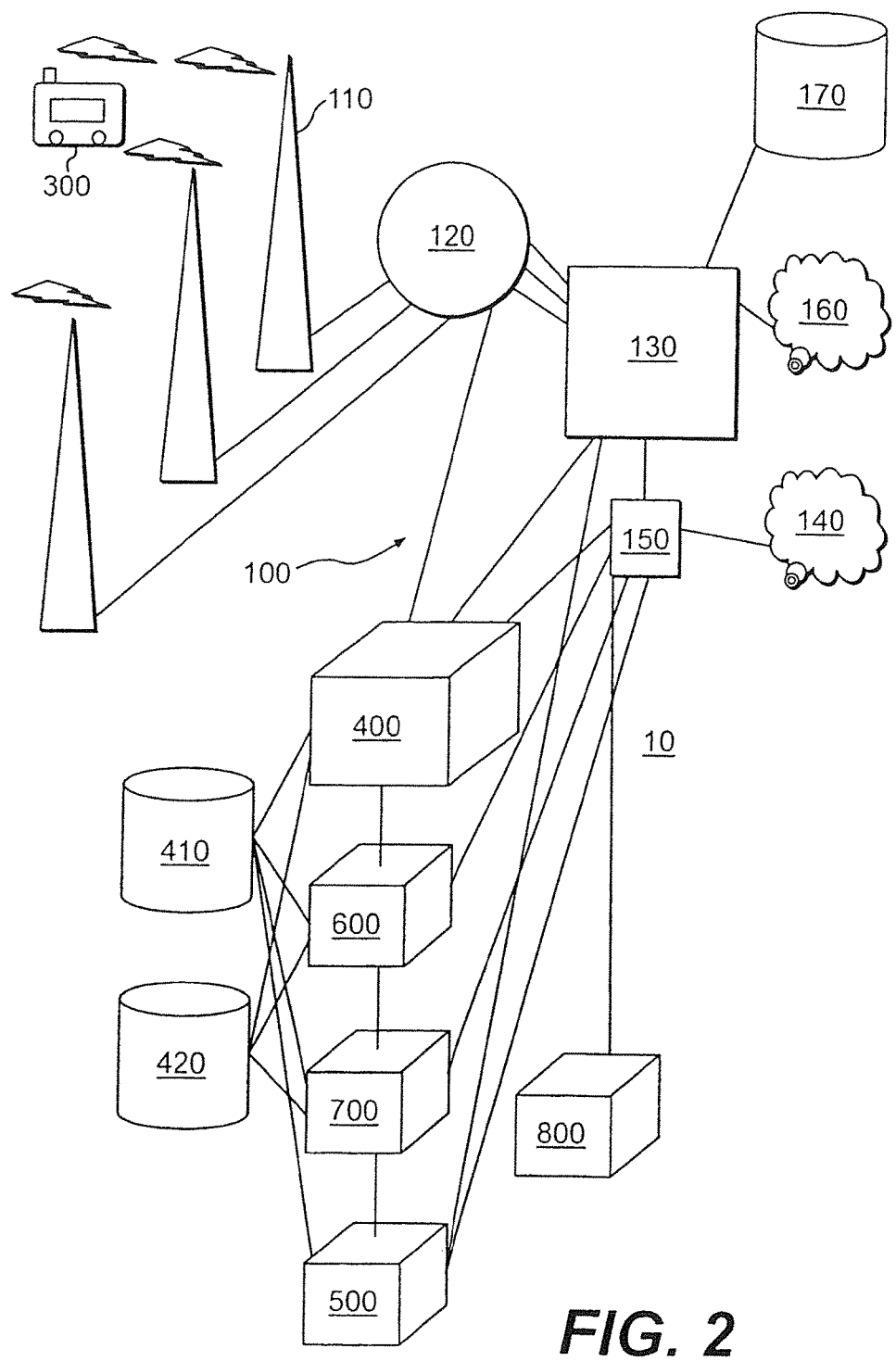
FIG. 2 is a schematic diagram illustrating an alternative preferred embodiment of the system of the present invention.

In an alternate preferred embodiment of the present invention, as shown in FIG. 2, the telecommunications network 100 is a wireless communications network. Other suitable embodiments of the telecommunications network 100 of the present invention, include, but are not limited to: Plain Old Telephone Service (POTS); Public Switched Telephone Network (PSTN); Integrated Services Digital Network (ISDN); Asymmetric Digital Subscriber Lines (ASDL); any of various other types of Digital Subscriber Lines (xDSL); Public Land Mobile Network (PLMN); the Internet; cellular; Global System Mobile (GSM); General Packet Radio Services (GPRS); Infrared Data Association (IrDA); Cellular Digital Packet Data (CDPD); Enhanced Data Rates for Global (or GSM) Evolution (EDGE); Universal Mobile Telecommunications System (UMTS), Ricochet proprietary wireless packet network; wireless local loop (WLL); Wireless Local Area Network (WLAN); 802.11; infrared; Bluetooth; Wide Area Network (WAN); Local Area Network (LAN); Optical; Line of Sight; satellite-based systems; Cable; User Datagram Protocol (UDP); SMR (walkie talkies); any portion of the unlicensed spectrum; wireline networks; and/or any other suitable telecommunications network 100. Any communications network is considered to be within the scope of the present invention, provided it is adapted to render the interactive application 200 to the user, as described herein.

The interactive system 10 of the present invention is preferably adapted for use in conjunction with a wireless communications network 100 that is data capable, as opposed to a first generation cellular (voice only) network. The present inventors anticipate that the wireless network 100 is preferably based upon PCS, TDMA, CDMA, CDPD, CDMAone, or any other suitable technology(ies) or standard(s) that are data capable.

As shown in FIG. 2, the wireless communications network 100 preferably further comprises one or more base station(s) 110, one or more base station controller(s) (BSC) 120, and one or more mobile switching center(s) (MSC) 130. As will be apparent to one of ordinary skill in the art, each base station 110 includes a transceiver (not shown) capable of transmitting signals to and receiving signals from the wireless access devices 300. In addition, each base station 110 is connected through the base station controller 120 to the mobile switching center 130.

The mobile switching center 130 preferably cooperates with the game server 400 through the Interworking Function ("IWF") 150. The IWF 150 is preferably connected to the Internet 140. As will be apparent to those of ordinary skill in the art, the IWF 150 comprises the necessary equipment and conversion algorithms to permit seamless communication between the mobile switching center 130 and the mobile game server 400, despite potentially dissimilar protocols supporting each of those components. Other embodiments of the IWF 150, such as, for example, a PCE node, a PDSN node, or any other node of similar functionality are considered within the scope of the present invention.

The mobile switching center 130 is preferably linked to the public switched telephone network (PSTN) 160. Further, in cooperation with the mobile switching center 130, the interactive system 10 preferably includes a home location register (HLR) 170 for identifying and/or verifying subscribers on the interactive system 10. As will be apparent to those of ordinary skill in the art, the wireless communications network 100 is adapted to allow communication between the wireless access devices 300 and the game server 400.

As shown in FIG. 2, the network 100 preferably further comprises message means 800 for providing communication between users. Message functions, such as SMS (Short Message Service), Text, Voice, and chat, are preferably provided in conjunction with the present invention in a manner known in the art prior to the preset invention.

In a preferred embodiment, the wireless communications network 100 is adapted to efficiently manage the air interface. In contrast with prior known systems, the data transfer rates of the present invention preferably are adapted to provide an enriched, realistic interactive application, such as a game, while minimizing the amount of bandwidth that is dedicated to providing the interactive application 200. For example, in a preferred embodiment, the interactive system 10 minimizes the number of degrees of freedom that must be managed over the wireless network 100 by providing predefined subroutines on the wireless access device 300.

In a preferred embodiment, the present invention efficiently manages spawned degree of freedom information, such as, for example, projectile information. In an interactive application where a projectile, such as, a missile, a rope, an arrow, etc., is launched, the system must transmit information and track movement of two discrete objects (the projectile and the image launching it). Prior known systems deliver multiple sets of instructions across the air interface. Other prior known systems deliver only one set of movement instructions, leading to a less realistic gaming experience.

In the present invention, the trajectory of the projectile preferably is calculated at the wireless access device 300, based on formulae or other data to depict movement of the projectile. The calculations, and the formulae required to make the calculations, preferably are game specific and are part of the interactive application 200 downloaded to the wireless access device 300. For example, when the interactive application 200 requires a ball to be thrown, the wireless access device 300 of the present invention preferably locally evaluates the trajectory and depicts the path that the ball will take, rather than sending and receiving multiple instructions over the network depicting each stage of movement of the ball. This prevents the present invention from tying up valuable network capacity.

The wireless access device 300 preferably receives update information from the game server 400, based on any conditions that would alter the trajectory that is calculated at the wireless access device 300. These may include, for example, shifts in wind direction and magnitude, or other forces. The use of the network's air interface remains efficient because the interactive system 10 preferably transmits only the minimum necessary information, in contrast to prior known systems that transmit at a full frame rate, regardless of the availability of or need for data for transmission.

In a preferred embodiment, the present invention more efficiently uses network resources by providing the least amount of information necessary at each point to enable the wireless access device 300 to render the interactive application 200. The present inventors anticipate that a number of methods may be used to reduce the amount of information necessary to enable the interactive application. It will be apparent to persons of ordinary skill in the art that various modifications and variations may be made and the manner in which the air traffic required to produce the interactive application may be reduced, without departing from the scope of the invention as claimed. For example, the amount of information transmitted over the wireless network 100 pertaining to the degrees of freedom of the interactive application 200 preferably is reduced. This function may be accomplished by any number of alternative and/or complimentary means. The instruction set is preferably layered. Sets of instructions are preferably grouped together in a logical fashion in order to reduce the amount of air traffic necessary to actuate the movement of a game piece. For example, the movement of a character that is running may be broken into several series of actions and instructions layered to depict groups of those actions. Arm movement may be depicted in one series of instructions; leg movement could be depicted in another; and movement of the character horizontally and/or vertically could be depicted in yet other layers of instructions.

Similarly, in an alternative preferred embodiment, multiple sets of instructions may be collapsed into a single instructions set, set(s) of codes, or subroutine(s). Although this would require creating a number of codes that represent the various actions the character could maintain, it offers the potential for dramatically reducing the amount of air interface traffic required to actuate the game. For example, in an embodiment of the present invention, many of the actions involved in the game are reduced to a single subroutine. Activities such as running, jumping, throwing, crawling, are reduced to a single or reduced instruction set so that when the single or reduced instruction set is transmitted over the wireless network 100, the character performs a series of actions corresponding to that activity.

The present invention preferably provides an enriched interactive gaming experience on a least cost basis. This is accomplished by minimizing the traffic over the air interface and more efficiently managing network resources. This enables the system operator to keep costs lower than those with previously known systems.

In a preferred embodiment of the present invention, the interactive application 200 preferably further comprises: an application 210; a device adaptation means 220; a communication means 230; and a mediation means 240, based on various criteria relating to the interaction of the users of the interactive entertainment service.

The interactive application 200 preferably comprises, without limitation, any one or more of the following: games; entertainment services; stock quotations; message boards; purchasing; advertising; news services; bill payment; instant messaging; email; location-based information and services; and any other interactive application. It will be apparent to persons of ordinary skill in the art that any of various applications may be adapted to be used with the present invention. Thus, it is intended that the present invention include all of the various applications that may be adapted to be used with the invention, provided they come within the scope of the appended claims and their equivalents.

The interactive application 200 is preferably further adapted to cooperate with certain features of the wireless network 100 or of the wireless access device 300. In a preferred embodiment, the wireless access device 300 preferably further comprises: controls 310, peripherals 320, and a user interface 330. The interactive application 200 may be adapted depending on the platform, or the particular hardware or software being employed on the wireless access device 300. Similarly, the interactive application 200 is preferably adapted depending on physical parameters, such as battery life for the form factor of the wireless access device 300.

The communications means 230 of the interactive application 200 of the present invention preferably comprises any one or more of: voice; physical feedback; text; video; images; attachments; or location-based information. Preferably, the present invention may be further adapted to provide, as applicable: voice mail; store and forward features; hand messaging features; the ability to deliver unique messages; email-, instant messaging; audio; video; images, text; electronic cards, music; advertising; peer-to-peer communications; geographic information; directions; and information on any other subject.

The physical feedback embodiments of the communication means 230 of the interactive application 200 of the present invention are preferably adapted to provide sensory input to the user comprising, without limitation, one or more of: vibration, such as through the use of a rumble pack; heat; pressure; sound, sight, through enhanced visual effects; smell; touch; and any other sensation.

The control means 600 of the game server 400 of the present invention preferably further includes a game mediation means 620 for mediating the interactive application 200 of the present invention based on various parameters regarding the level of play and the interaction of the users. The game mediation means 620 may be embodied in the interactive application 200 as a software application and/or in an algorithm that resides on one or more servers in the interactive system 10.

As embodied herein, the wireless access device 300 is any user device that is adapted to interface with the communications network 100 to provide a multiplayer, interactive game. In the preferred embodiment, the wireless access device 300 comprises a wireless communications device such as a mobile phone. In other alternative preferred embodiments, the wireless access device 300, comprises: a personal digital assistant (PDA); a pager; a wireless game controller; and/or an email device.

The wireless access device 300 preferably includes one or more peripherals 320 comprising: headphones; earphones; cables; joysticks; paddles; cameras; microphones; speakers and external keypads.

The wireless access device 300 is adapted to run on any platform necessary to provide the interactive application 200 and the desired functionality of the interactive system 10. The platform preferably includes any number of operating systems known in the art, such as, for example, Palm, Windows, Symbian, Java, Mac, or any other operating system capable of supporting the functionality of the interactive system 10.

In an alternative preferred embodiment, the wireless access device 300 is adapted to provide voice-over-packet services. These services further comprise interactive group communications service, such as the QChat application developed by Qualcomm. QChat serves as a wireless extension of Internet Chat and instant messaging services. These services are employed by minimizing the packet frame size used for the communication during times of network congestion or any other time determined by the carrier. The voice-over-packet is preferably limited to halfrate frames to minimize the amount of data sent at the expense of voice quality.

In the preferred embodiment, as shown in FIGS. 1 and 2, the present invention comprises the game server 400. The game server 400 preferably enables a user to play an interactive entertainment application 210 and further comprises means for downloading, purchasing, selling, and billing the user for the application 210. The game server 400 comprises any server with a network interface adapted for use in conjunction with the communications network 100, the interactive application 200, and the wireless access device 300 of the present invention 10. In a preferred embodiment, the game server 400 comprises a Sun Metra Platform. The applications (games) 210 are typically sold in client (single player) and server (multi-player) versions. The game server 400 of the present invention is adapted to provide games 210 and other applications over a wireless communications network.

The game server 400 of the present invention preferably further comprises: a synchronization means 500 for synchronizing the state of play between the users and the network 100; a control means 600 for controlling the state of the interactive application; and a network mediation means 700 for controlling delivery of the interactive application 200 to the one or more users. The game server 400 preferably comprises one or more servers. The synchronization means 500, the control means 600, and the network mediation means 700 may reside on the same or different server(s). As shown in FIG. 2, and will be apparent to those of ordinary skill in the art, any of a number of configurations of the game server 400 would allow for communication with the interactive system 10 of the present invention. For example, the functions of the game and player databases 410 and 420, and of the synchronization means 500, the control means 600, and the mediation means 700 may be embodied in a single or multiple structures. Alternatively the game server 400 could be housed within or separate from the network 100 or any of its components. The interface(s) 900 preferably are adapted accordingly.

The game server 400 preferably further comprises a game database 410 for storing various game software and/or other interactive applications, and a player profile database 420 for storing the profiles of subscribers to the interactive system 10. The hardware employed its preferably of the type known in the art for data storage and retrieval functions. Similarly, the connections between the components of the game server 400, the synchronization means 500, the control means 600, and the mediation means 700, are preferably high speed, router-server connections, of the type well known in the art.

In a preferred embodiment, the game server 400 of the present invention further comprises the synchronization means 500, for synchronizing the transmission and display of the interactive application 200. The synchronization means 500 may be embodied in a software application and/or an algorithm that resides on the game server 400. The synchronization means 500 is adapted to enable the user to experience a robust and jitter-free gaming environment. The synchronization means 500 identifies when any of the players are in a game state that is not the same as the game state of the server, or of the other players. The game server 400 preferably calculates the correct game state. The synchronization means 500 is adapted to cooperate with the game server 400 which provides information about the state the player should be in. The synchronization means 500 orders the interactive application 200 to make the appropriate changes to bring the players into synchronization.

Gaming applications 210 are typically subject to creep or wander problems. It is preferable, therefore, to maintain synchronization between each wireless access device 300 and the network 100, relative to the state of play of the interactive application 200. That is, each player in the interactive session should see on their display the same state of the game as each of the other players. This synchronization of the game state may be accomplished in the present invention through any of a number of mechanisms including, without limitation, providing separate synchronization means 500 for synchronizing the systems; monitoring the manner in which the system is mediated; or imposing separate software systems or control features to limit or eliminate creep and wander.

In the preferred embodiment, the wireless access device 300 will transmit its overall state information to the synchronization means 500 at a given interval. The timing and length of the interval will vary depending on the interactive application (game) being played, its complexity, and the number of degrees of freedom involved. The synchronization means 500 will then determine, based on the state information it receives from all of the wireless access devices 300 in the particular interactive session, what actions, if any, need to be taken.

The control means 600 of the present invention preferably is adapted to manage the realtime state of play of the interactive application 200; maintain overall synchronization of players during the game; ensure proper distribution of information to and from the players; and route information to the appropriate players as required. The control means 600 is preferably further adapted to determine or place users into different networks as appropriate for game play. This function is preferably accomplished through cooperation with and based on information supplied by the mediation means 700, as well as by the users' themselves.

The control means 600 preferably comprises a server of the type well known in the art. The control means 600 preferably further comprises a generic processor operating at a fast clock rate, such as a Sun SPARC work station. The processor may be a single, dual, multiple, distributed, or multithreading processor. In a preferred embodiment, the game server 400 of the present invention preferably operates at the router frame rate and provides handicapping, based upon information supplied by users and or the users' profile(s) from player database 420. The control means 600 also preferably provides error correction functions.

The control means 600 preferably further comprises the game mediation means 620. When users of different skill levels interact in an application, the game mediation means 620 preferably defines the state of play in order to achieve a level playing experience. Because the game mediation means 620 has access to each player's profile in the player database 420, the game mediation means 620 has access to information such as, for example, how well the player has performed on a particular game, in the past, and how often they have played a particular game. With this information, the game mediation means 620 preferably assigns a rating to a player for a particular game. Individual game ranking is stored in a user's profile stored in the player database 420. The game mediation means 620 preferably allows players to enter into the interactive session who are within a given rating for the game being played. In alternative preferred embodiments, the game mediation means 620 notifies players in the interactive session that one player may be more (or less) skilled than another.

Alternatively, the game mediation means 620 preferably mediates the interactive application 200 based on features of the wireless access devices 300 in a particular interactive session and/or other factors relevant to a player's gaming experience. The game mediation means 620 preferably further comprises one or more of the following features: display; processor; user preference; language; file support; identity of the user; other features or characteristics of the user; the access device being employed; the control means being used; bandwidth requirements; and ping rate. The game mediation means 620 is preferably in communication with each wireless access device 300 prior to the start of a gaming session, the present invention preferably is supplied with information regarding these various factors.

In alternative preferred embodiments of the present invention, the control means 600 performs the processes illustrated in FIGS. 5, 6, and 7. After the user has logged onto the system and requested game play, the interactive system 10 locates other players who wish to participate in the interactive gaming session. The control means 600 retrieves player information from the player database 420 and game information from the game database 410. The control means 600 retrieves information about each wireless access device 300 and its connection over the wireless network 100. The control means 600 then determines the skill level of the players who have indicated that they wish to join the gaming session.

The process of determining a player's skill level preferably comprises determining the player's past performance at playing this particular game and ranking the players based on past performance. The ranking system used by the control means 600 preferably includes scalable nomenclature, which may be as simple as a numerical ranking from 1 (novice) to 5 (expert), or may comprise any nomenclature adapted to application 200. The control means 600 communicates each player's skill level to other players. Each user is then prompted on their wireless access device 300 whether they wish to continue playing. If any players choose to opt out of the gaming session, the system may be adapted to locate replacement players.

After the system establishes the players, the control means 600 evaluates the capabilities of each of the users based on their wireless access device 300 and their connection to the wireless communications network 100, as discussed above. The control means 600 then preferably compensates for skill, device, and connection differences as shown in FIGS. 5, 6, and 7.

The control means 600 of the present invention preferably is further adapted to provide an enriched data environment, without sacrificing the efficient management of the air interface. Each wireless access device 300 may have high resolution, and may be black and white, monochrome, or color. In a preferred embodiment, the present invention preferably further comprises a color management means 350 for managing the delivery of color to the wireless access device 300. In an alternative preferred embodiment, the invention comprises interlacing techniques such as those known in the broadcast industry. When color is used, the interactive system 10 of the present invention provides an efficient, yet enriched, data environment by defining color as a degree of freedom.

For example, the facial color of a character in the interactive application 200 is preferably defined by one degree of freedom with three states (e.g., orange, red, and purple). The face may be defined in the (client) wireless access device 300 by transmitting only the state of the facial color over the air interface. When the character's face becomes bruised, for example, the interactive system 10 transmits "purple" state information only. In addition, in a manner similar to that by which the trajectory of a projectile is calculated, the present invention further reduces airlink traffic by calculating the state information at the wireless access device 300 instead of transmitting the information over the network. For example, if events x and y occur, the wireless access device 300 is adapted to display a color state z.

The control means 600 of the present invention is preferably adapted to use user profiles stored on the player database 420 for providing a personalized, interactive application. For example, the user profile preferably comprises information about a user's experience level, enabling the interactive system 10 to supplement the interactive application with personalized messages, such as prompts, game hints, and help files. The user profile preferably further comprises: the genre(s) of application(s) in which the user is interested, a user's skill rank for a particular game, training files to allow a user to improve his/her skill level at a particular game, and messages aimed at taunting the user during play. The network infrastructure for providing the user profile functionality to the control means 600 of the present invention preferably further comprises the subject matter described in U.S. Provisional patent application Ser. No., entitled "Method and System for Content Distribution Over a Wireless Communications System," filed Mar. 16, 2001, which is incorporated herein by reference as if fully set forth herein.

The control means 600 of the present invention is preferably further adapted to monitor and/or limit a user's access to particular interactive applications. For example, the control means 600 may prevent a user from accessing an interactive application that the user's wireless access device 300 is not capable of supporting (lack of graphics capability, lack of processing speed, software version incompatibility, etc.), or may limit a user's access to a particular gaming application if the user has not attained, or maintained, a certain skill level (too skilled or not skilled enough). In this manner, the control means 600 may be adapted to sort stored user profiles and match users based on predefined ranges of skill, equipment specifications, and/or other attributes. The control means 600 is preferably further adapted to allow users to request to play other users that may be outside these ranges. In these instances, the control means 600 preferably notifies the users of the (dis)advantages of the other player(s). The control means 600 preferably further comprises a handicapping mechanism for leveling the playing field.

The control means 600 is preferably further adapted to recognize the location of a wireless access device 300. The control means 600 may further comprise software that recognizes the GPS and/or ANI address information of the user or the wireless access device 300. Location information is preferably gathered and transmitted by the wireless access device 300, using GPS and location software and/or estimation methods of the type known in the art. For example, location information may be estimated by the interactive system 10 based on any one or more of prior known methods, comprising one or more of: round trip signal delay; triangulation; received power; and the cell site location with which the wireless access device 300 is in communication.

In a preferred embodiment of the present invention, the control means 600 is further adapted to provide administration services. The control means 600 preferably stores directories of users of the interactive system 10, allocated into certain affinity groups, or interactive communities. The present invention preferably comprises administrative service means and interactive community functionality, as disclosed in U.S. patent application Ser. No. 09/833,656, entitled "Method and System to Facilitate Interaction Between and Content Delivery to Users of a Wireless Communications Network," filed Apr. 13, 2001, which is incorporated herein by reference as if fully set forth herein.

The control means 600 of the present invention preferably further comprises a game management means 610 for managing a particular gaming interactive application. The game management means 610 is adapted to alter the overall states of certain global degrees of freedom. For example, the game management means 610 adjusts the conditions of the field of play for a gaming application by providing instructions to the wireless access device 300 for rain, snow, wind, or any other change of field or state of play conditions. The instructions preferably are provided to the wireless access device 300 in an arbitrary fashion, or according to a schedule stored in the control means 600. In the preferred embodiment of the present invention, the game management means 610 is an algorithm or software means designed for a specific gaming application 200. In an alternative preferred embodiment, the game management means 610 is performed through human intervention at the administrator level of the wireless communication network.

The control means 600 preferably further comprises error correction means 630 for minimizing transmission errors during delivery of the interactive application. The error correction means 630 comprises any of the known error correction techniques, for example: block coding methods; convolutional coding methods; or any other error correction methods known by those of ordinary skill in the art.

It will be apparent to persons of ordinary skill in the art that numerous variations may be made in the present invention, without departing from the scope and spirit of the present invention. In the preferred embodiment, users are billed according to Assignee's Cricket™ business model. Users may be billed based upon: a flat rate with unlimited use; on a pre-paid basis; based on minutes of use; on a pay per play basis; and/or any combination of known billing methods. In addition, the provision of the interactive application 200 to the user may be sponsored, such that the user receives a discounted or subsidized rate, in return for listening to personalized advertisements before, during, and/or after the interactive session. The control means 600 preferably is adapted to manage these billing functions.

The control means 600 of the present invention preferably further comprises means to maintain a persistent state of play. For example, a user may end an interactive gaming session and the control means 600 will store the session so that the user may resume the session at a later time. Alternatively, if the user ends a gaming session that included multiple players, the control means 600 is preferably adapted to store the session so that it may be resumed by all or certain of the players at a later time.

The control means 600 preferably further comprises back up, fail over, and/or redundancy systems to prevent data, such as a user profile and/or stored gaming session information, from being lost. The control means 600 preferably comprises known systems and methods, such as, for example, RAID storage, active mirroring of information, hear-beat signaling, load sharing, and/or any other methods known by those of ordinary skill in the art.

In a preferred embodiment, the network mediation means 700 of the present invention is adapted to match players for multi-player gaming. The network mediation means 700 preferably employs user profile information to establish the application 210 adapting the gaming parameters to control: latency; degrees of freedom; skill levels; and device and connection types. The network mediation means 700 preferably employs means similar to those used by the control means 600, yet, the network mediation means 700 need not run as close to real time as the control means 600 in a preferred embodiment of the present invention.

The network mediation means 700 preferably mediates communications based upon specifications of each wireless access device 300, the interactive application 200, location of the user, and user profiles stored by the control means 600. Once it has determined that peer-to-peer communication is possible for a particular interactive session, the network mediation means 700 preferably directs each wireless access device 300 to engage in a peer-to-peer interactive session. During this session, each wireless access device 300 would download any necessary information from the interactive system 10, and send limited information to the system 10 to maintain the proper level of knowledge required to provide an enhanced interactive experience. This information preferably would include, for example, final scores, standings, and/or any other game related statistics that may provide the system with a better understanding of the user and their experience. In addition, information may be sent from the network to the wireless access device 300, such as, for example, personalized messages and/or advertisements that are not resident on the device.

Other than the limited information sent to or from the wireless access device 300 during peer-to-peer mode, the wireless access devices 300 communicate directly with each other the necessary information to maintain the game. This is advantageous because it reduces the amount of information that is transmitted across the wireless network 100 and reduces the operator's service costs without infringing on the user's playing experience.

The network mediation means 700 preferably is embodied in a software application and/or algorithm that resides on one or more servers in the interactive system 10. The network mediation means 700 preferably delivers the interactive application through a client-server environment over the wireless network 100. In an alternative preferred embodiment, the network mediation means 700 delivers the interactive application in a peer-to-peer environment independent of the wireless network 100. In other embodiments, the network mediation means 700 preferably delivers the interactive application in a hybrid environment that incorporates the client-server environment in conjunction with the independent peer-to-peer environment.

Delivery of the interactive application by the network mediation means 700 preferably is based on many factors. The network mediation means 700 preferably takes into account the spectral efficiency of the wireless network 100. For a particular interactive application session at a given time, the higher the spectral efficiency of the wireless network 100, the more of the interactive application that can reside on the server in the interactive system 10. In contrast, when spectral efficiency is low, the network mediation means 700 preferably sends more of, or the entire, interactive application to the user's wireless access device (preferably at low network usage times) so that the application may be used in a peer-to-peer or hybrid environment.

Mediation and delivery of the interactive application preferably further depends on the value of the interactive application itself and the corresponding security measures appropriate to protect the interactive application 200. For example, a proprietary video game that is valuable to the system operator would preferably be stored substantially on the server and would not be downloaded substantially to the (client) wireless access device 300. Less valuable games preferably would be distributed substantially or completely to the client devices in order to reduce air traffic and conserve network resources.

In an alternative preferred embodiment, service is rendered on a hybrid basis. In a hybrid scenario, the structures, functions, and steps involved are substantially the same. If the interactive system 10 determines that it is desirable to provide some degree of peer-to-peer play, it is adapted to do so. Synchronization information is preferably passed from the devices running peer-to-peer to the network. The system will also receive any changes required to maintain synchronization from the network. In the event that some devices are on alternate network types (i.e., 802.11), synchronization commands are preferably sent to the devices over that alternative network. All other game commands are preferably sent through the selected means (i.e., peer-to-peer). Thus, the system is adapted to provide efficient air link utilization.

The present invention (preferably further comprises interfaces 900 in certain embodiments, for enabling communication between the various components of the invention. The interface connections 900 between the wireless network 100 and the game server 400 preferably are accomplished over any one or more of the interface links 900 shown in FIG. 2. In a preferred embodiment, the BSC 120 and/or the MSC 130 are preferably connected to the game server 400 over the "L Interface" 910 (Standard IS-658, which is incorporated herein by reference) in a manner conventional in the art. Similarly, the IWF 150 is preferably connected to the game server 400, the control means 600, and/or the mediation means 700 over TCP, IP, or Mobile IP protocols 910 in a manner known in the art. TCP, IP, and/or Mobile IP protocols are promulgated by standards setting organizations such as the IETF, which standards are well known in the art and are incorporated herein by reference. In alternative preferred embodiments, other interface protocols, such as WAP (Wireless Application Protocol), CPDP, Mobitex, DataTac, i-Mode, or other protocols may be adapted to the present invention.

Various equipment manufacturers have implemented the standards in a manner that is adapted to their equipment. Lucent, Nokia, Ericsson, and other equipment manufacturers have each adapted the interface standards to their particular equipment and applications. Thus, it is intended that the interfaces 900 of the present invention be adapted to the implementation of the standards by the manufacturer of the equipment being employed.

In a preferred embodiment, the interface 900 between the user access device 300 and the network 100 is of a type known in the art of wireless communications services. Preferably, the network 100 is adapted to send variable length, rather than full length packets as is conventional in the art prior to the present invention. Packet transmission is preferably controlled to override the full length packet filler. Standard bin sizes (full, half, quarter, eighth) are preferably used and the transmission rate of the packets is preferably fixed, although these variables may also be adapted to improve the efficiency of use of the air interface. The present invention preferably forces the manner in which bits are packed within frames to improve the efficiency of use of the air interface.

Interface connections between various of the components of the game server 400, and in particular, the game database 410, the user database 420, the synchronization means 500, the control means 600, and the mediation means 700, of the present invention are preferably high speed router protocol connections of the type well known in the art.

The wireless network 100 preferably further comprises a plurality of "information service stations," or sub-networks, which may be located at various locations, such as, convenience stores, gas stations, and shopping malls, where a user may make a high speed or broadband connection with the wireless network 100 and receive updates relating to the interactive application 200 being used. Sub-networks are preferably adapted to have their own characteristics in addition to the characteristics of the master wireless network 100. For example, a user in a specific sub-network, such as, for example, a shopping mall, may receive information, as part of the interactive application 200, about stores located within the mall. A user may be notified about other users/players that are in the sub-network that the user may want to join in the interactive session. Finding potential players proximate (discussed below) to a particular user would enable the network mediation means 700 to join the players, at least in part, in a peer-to-peer environment, which allows for more efficient use of the network resources and enables more real-time interactive play. Sub-networks may offer lower cost service than the wireless network 100.

The delivery of the interactive application 200 by the network mediation means 700 preferably is further based on the proximity of the various users to one another. For example, if the multiple users are all located in close proximity to one another, for example, in the range of about 10 meters to about 100 meters, the network mediation means 700 will deliver the interactive applications to the user access devices 300 and enable their interactive session to occur in a peer-to-peer environment. In this instance, the wireless network 100 may resemble, for example, a Bluetooth network.

The present inventors anticipate that the system and method of the present invention are fully compatible and usable in conjunction with PC based games, as well as Internet applications, and TV-based games. In addition, the present inventors anticipate that the service employing the system and method of the present invention may be offered as a flat rate offering in conjunction with services such as Assignee's CricketT" wireless communications service. Such services may be offered on a prepaid billing service for game purchase.

Numerous other variations and modification will be apparent to persons of ordinary skill that will facilitate the delivery of wireless interactive applications, at high level of graphic quality, while more efficiently using network bandwidth and resources than prior known systems and methods. Thus, it is intended that the present invention include the variations and modification that may be used in conjunction with them, provided they come within the scope of the appended claims and their equivalents.

What is claimed:

1. A method comprising:
facilitating interactive communications services to a plurality of users using a plurality of user communications devices via a communications server over a wireless network;
detecting degradation in performance of the interactive communications services between two or more of the plurality of user communications devices;
requesting, after a predetermined temporal period, state information from at least two of the plurality of user communications devices, wherein the state information is indicative of the degradation;
receiving data indicative of the requested state information and detecting, using the requested stated information, differences in degradation between a first and a second of the at least two of the plurality of user communications devices;
alleviating a perception of the degradation between the first and the second of the at least two of the plurality of user communications devices by smoothing the interactive communications services at one of the at least two of the plurality of user communications devices if the differences exceed a given threshold;
identifying a skill level associated with said communications services of at least one of said plurality of users; and
communicating said identified skill level to at least one other of said plurality of users.

2. The method of claim 1, further comprising:
logging the at least one of said users on to said wireless communications network;
receiving requests for said communications services;
identifying the at least one of said plurality of users logged on;
identifying, after the at least one of said plurality of users is logged on, the skill level associated with said communications services of the at least one of said identified users; and
communicating said identified skill level to at least one other of said plurality of users logged on.

3. The method of claim 1, further comprising:
retrieving data associated with said identified at least one other logged on user;
retrieving data associated with said communications services, wherein said smoothing comprises adjusting a state of at least one of said communications devices;
querying at least one of said communications devices to determine at least one capability; and
determining locations respectively associated with said at least two of said communications devices, wherein said determining locations comprises receiving data indicative of said locations from said at least two communications devices.

4. The method of claim 1, further comprising:
establishing a peer-to-peer communications session associated with said communications services between said at least two communication devices if said locations associated with said at least two communications devices are within a given threshold; and
terminating said peer-to-peer communications session and uploading data indicative of said interactive communication services via wireless said communications network.

5. The method of claim 1, further comprising:
querying said at least two communication devices for data indicative of at least one capability, wherein said at least one capability comprises a processing capability, and a display capability; and
determining at least one capability common to said queried communications devices and using said common capability for said communications services.

6. The method of claim 1, further comprising:
querying said at least two communications devices for data indicative of respective signal strengths; and
initiating said communications services, wherein said requesting state information comprises querying said at least two communications devices for data indicative of at least one latency associated with said wireless communications network, respectively, wherein said smoothing comprises adjusting a state of at least one of said at least two communications devices to substantially match that of at least one other of said at least two communications devices, wherein said adjusting comprises snapping.

7. A system comprising:
a communication server coupled to a plurality of user communication devices over a wireless network, wherein the communication server is capable of:
facilitating interactive communications services to a plurality of users using the plurality of user communications devices;
detecting degradation in performance of the interactive communications services between two or more of the plurality of user communications devices;
requesting, after a predetermined temporal period, state information from at least two of the plurality of user communications devices, wherein the state information is indicative of the degradation;
receiving data indicative of the requested state information and detecting, using the requested stated information, differences in degradation between a first and a second of the at least two of the plurality of user communications devices;
alleviating a perception of the degradation between the first and the second of the at least two of the plurality of user communications devices by smoothing the interactive communications services at one of the at least two of the plurality of user communications devices if the differences exceed a given threshold;
identifying a skill level associated with said communications services of at least one of said plurality of users; and
communicating said identified skill level to at least one other of said plurality of users.

8. The system of claim 7, wherein the communication server is further capable of:
logging the at least one of said users on to said wireless communications network;
receiving requests for said communications services;
identifying the at least one of said plurality of users logged on;
identifying, after the at least one of said plurality of users is logged on, the skill level associated with said communications services of the at least one of said identified users; and
communicating said identified skill level to at least one other of said plurality of users logged on.

9. The system of claim 7, wherein the communication server is further capable of:
retrieving data associated with said identified at least one other logged on user;
retrieving data associated with said communications services, wherein said smoothing comprises adjusting a state of at least one of said communications devices;
querying at least one of said communications devices to determine at least one capability; and
determining locations respectively associated with said at least two of said communications devices, wherein said determining locations comprises receiving data indicative of said locations from said at least two communications devices.

10. The system of claim 7, wherein the communication server is further capable of:
establishing a peer-to-peer communications session associated with said communications services between said at least two communication devices if said locations associated with said at least two communications devices are within a given threshold; and
terminating said peer-to-peer communications session and uploading data indicative of said interactive communication services via wireless said communications network.

11. The system of claim 7, wherein the communication server is further capable of:
querying said at least two communication devices for data indicative of at least one capability, wherein said at least one capability comprises a processing capability, and a display capability; and
determining at least one capability common to said queried communications devices and using said common capability for said communications services.

12. The system of claim 7, wherein the communication server is further capable of:
querying said at least two communications devices for data indicative of respective signal strengths; and
initiating said communications services, wherein said requesting state information comprises querying said at least two communications devices for data indicative of at least one latency associated with said wireless communications network, respectively, wherein said smoothing comprises adjusting a state of at least one of said at least two communications devices to substantially match that of at least one other of said at least two communications devices, wherein said adjusting comprises snapping.

13. A non-transitory machine-readable medium having stored thereon instructions which when executed by one or more processing devices, cause the one or more processing devices to perform one or more operations comprising:
facilitating interactive communications services to a plurality of users using a plurality of user communications devices via a communications server over a wireless network;

detecting degradation in performance of the interactive communications services between two or more of the plurality of user communications devices;

requesting, after a predetermined temporal period, state information from at least two of the plurality of user communications devices, wherein the state information is indicative of the degradation;

receiving data indicative of the requested state information and detecting, using the requested stated information, differences in degradation between a first and a second of the at least two of the plurality of user communications devices;

alleviating a perception of the degradation between the first and the second of the at least two of the plurality of user communications devices by smoothing the interactive communications services at one of the at least two of the plurality of user communications devices if the differences exceed a given threshold;

identifying a skill level associated with said communications services of at least one of said plurality of users; and communicating said identified skill level to at least one other of said plurality of users.

14. The machine-readable medium of claim 13, wherein the one or more operations comprise:

logging the at least one of said users on to said wireless communications network;

receiving requests for said communications services;

identifying the at least one of said plurality of users logged on;

identifying, after the at least one of said plurality of users is logged on, the skill level associated with said communications services of the at least one of said identified users; and communicating said identified skill level to at least one other of said plurality of users logged on.

15. The machine-readable medium of claim 13, wherein the one or more operations comprise:

retrieving data associated with said identified at least one other logged on user;

retrieving data associated with said communications services, wherein said smoothing comprises adjusting a state of at least one of said communications devices;

querying at least one of said communications devices to determine at least one capability; and determining locations respectively associated with said at least two of said communications devices, wherein said determining locations comprises receiving data indicative of said locations from said at least two communications devices.

16. The machine-readable medium of claim 13, wherein the one or more operations comprise:

establishing a peer-to-peer communications session associated with said communications services between said at least two communication devices if said locations associated with said at least two communications devices are within a given threshold; and terminating said peer-to-peer communications session and uploading data indicative of said interactive communication services via wireless said communications network.

17. The machine-readable medium of claim 13, wherein the one or more operations comprise:

querying said at least two communication devices for data indicative of at least one capability, wherein said at least one capability comprises a processing capability, and a display capability; and determining at least one capability common to said queried communications devices and using said common capability for said communications services.

18. The machine-readable medium of claim 13, wherein the one or more operations comprise:

querying said at least two communications devices for data indicative of respective signal strengths; and initiating said communications services, wherein said requesting state information comprises querying said at least two communications devices for data indicative of at least one latency associated with said wireless communications network, respectively, wherein said smoothing comprises adjusting a state of at least one of said at least two communications devices to substantially match that of at least one other of said at least two communications devices, wherein said adjusting comprises snapping.

* * * * *